US 12,460,965 B2

(12) United States Patent
Lin et al.

(10) Patent No.: US 12,460,965 B2
(45) Date of Patent: Nov. 4, 2025

(54) OPTICAL SENSING MODULE

(71) Applicant: LITE-ON TECHNOLOGY CORPORATION, Taipei (TW)

(72) Inventors: Chen-Hsiu Lin, New Taipei (TW); Yu-Chou Lin, New Taipei (TW)

(73) Assignee: LITE-ON TECHNOLOGY CORPORATION, Taipei (TW)

( * ) Notice: Subject to any disclaimer, the term of this patent is extended or adjusted under 35 U.S.C. 154(b) by 112 days.

(21) Appl. No.: 18/617,716

(22) Filed: Mar. 27, 2024

(65) Prior Publication Data

US 2024/0377244 A1 Nov. 14, 2024

Related U.S. Application Data

(60) Provisional application No. 63/465,884, filed on May 12, 2023.

(30) Foreign Application Priority Data

Oct. 23, 2023 (CN) .......................... 202311368935.0

(51) Int. Cl.
*G01J 1/04* (2006.01)
*G01J 1/42* (2006.01)

(52) U.S. Cl.
CPC ............... *G01J 1/0403* (2013.01); *G01J 1/42* (2013.01)

(58) Field of Classification Search
CPC ........... G01J 1/0403; G01J 1/42; G01J 1/0271
See application file for complete search history.

(56) References Cited

U.S. PATENT DOCUMENTS

| 6,521,882 | B1 * | 2/2003 | Sumiya | ..................... G01J 1/04 356/139.01 |
| 6,997,739 | B2 * | 2/2006 | Hoxha | .................. H01R 13/42 439/518 |
| 2016/0223393 | A1 * | 8/2016 | Hsu | ....................... G01J 9/0246 |

* cited by examiner

*Primary Examiner* — Tony Ko
(74) *Attorney, Agent, or Firm* — Li & Cai Intellectual Property (USA) Office

(57) ABSTRACT

An optical sensing module includes a substrate, an optical sensing device, and a plurality of solders. The substrate has an upper surface, and the upper surface has a plurality of first soldering pads. The optical sensing device is disposed upright on the substrate. The optical sensing device includes a transposition plate and an optical sensing package. The transposition plate includes a first surface, a second surface, and a third surface. The first surface has a plurality of second soldering pads, the second surface has a plurality of conductive through holes, and the third surface has a plurality of metal ribs. The conductive through holes are electrically connected to the second soldering pads and the metal ribs. The optical sensing package is disposed on the first surface and electrically connected to the second soldering pads. The plurality of solders climb onto the plurality of metal ribs, respectively.

16 Claims, 10 Drawing Sheets

OPTICAL SENSING MODULE

CROSS-REFERENCE TO RELATED PATENT APPLICATION

This application claims the benefit of priority to the U.S. Provisional Patent Application Ser. No. 63/465,884, filed on May 12, 2023, which application is incorporated herein by reference in its entirety. This application claims the benefit of priority to the China Patent Application No. 202311368935.0, filed on Oct. 23, 2023, the content of which is incorporated herein by reference in its entirety.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to an optical sensing module, and more particularly to an optical sensing module with a lateral packaging structure.

BACKGROUND OF THE DISCLOSURE

Generally, the optical sensing module can be a forward packaging structure or a lateral packaging structure. In the lateral packaging structure, a sensing chip is connected to a circuit board through a transposition plate. The sensing chip is laterally disposed on the transposition plate, and the sensing chip and the transposition plate jointly form a lateral packaging structure, which is disposed upright on the circuit board.

The transposition plate is soldered to the circuit board by applying solder paste to conductive blind holes at the bottom thereof. In the relevant art, the conductive blind holes at the bottom of the transposition plate are semi-blind hole structures, that is, the conductive blind holes do not extend to a surface of the transposition plate for fixing the sensing chip, but are only disposed on a lateral surface of the transposition plate away from the sensing chip. When the transposition plate is soldered to the circuit board through the solder paste, a larger amount of tin is provided at the lateral surface of the transposition plate away from the sensing chip (since the solder paste is concentrated in the position of the conductive blind holes), while a smaller amount of tin is provided at another lateral surface of the transposition plate for fixing the sensing chip. Therefore, the amount of tin on both sides of the bottom of the lateral packaging structure is uneven, which causes the overall structure to be unstable. In addition, in the relevant art, the amount of tin at the bottom of the lateral packaging structure is insufficient to support the weight of the sensing chip. The overall structure tends to be tilted toward a side where the sensing chip is fixed by the transposition plate, thereby negatively affecting the product yield.

Therefore, how to overcome the above-mentioned problem through an improvement in structural design has become an important issue to be addressed in the relevant art.

SUMMARY OF THE DISCLOSURE

In response to the above-referenced technical inadequacy, the present disclosure provides an optical sensing module so as to address an issue of the lateral packaging structure in the relevant art being likely to be tilted due to a biased gravity center of the lateral packaging structure.

In order to solve the above-mentioned problems, one of the technical aspects adopted by the present disclosure is to provide an optical sensing module, which includes a substrate, an optical sensing device, and a plurality of solders. The substrate has an upper surface, and the upper surface has a plurality of first soldering pads. The optical sensing device is disposed upright on the substrate. The optical sensing device includes a transposition plate and an optical sensing package. The transposition plate has a first surface, a second surface, and a third surface. The first surface and the third surface are located on opposite sides of the transposition plate, and the second surface is connected between the first surface and the third surface. The first surface has a plurality of second soldering pads. The second surface has a plurality of conductive through holes. The third surface has a plurality of metal ribs. The plurality of conductive through holes are electrically connected to the plurality of second soldering pads and the plurality of metal ribs. The optical sensing package is disposed on the first surface and electrically connected to the plurality of second soldering pads. The plurality of solders are connected to the plurality of conductive through holes and the plurality of metal ribs. A top of each of the metal ribs and a surface of a corresponding one of the first soldering pads have a first height therebetween. The plurality of solders respectively climb onto the plurality of metal ribs. A climbing height of each of the solders on a corresponding one of the metal ribs is a second height, and a ratio of the second height to the first height is greater than 0.25.

In the optical sensing module provided by the present disclosure, by virtue of the metal ribs being connected to the conductive through holes that are disposed on the third surface of the transposition plate away from the optical sensing package, the solders can further climb from the conductive through holes to the metal ribs to a certain height, so as to improve the adhesive force of the solders bonding to the back side of the transposition plate and the overall structural strength, and prevent the overall structure from being tilted towards the side where the sensing element is fixed on the transposition plate.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
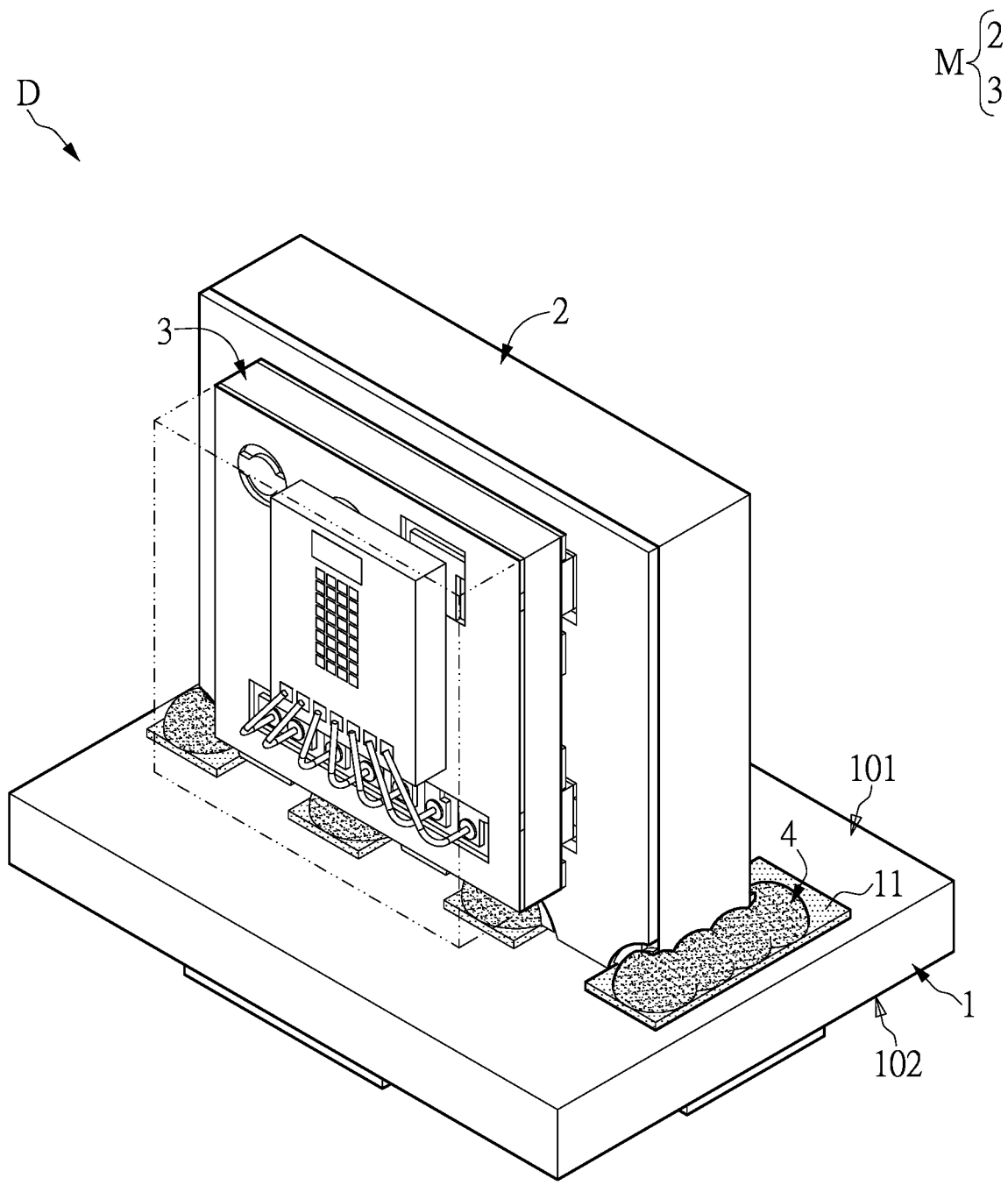
FIG. 1 is a schematic view of an optical sensing module according to the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

Embodiment

Figure 2:
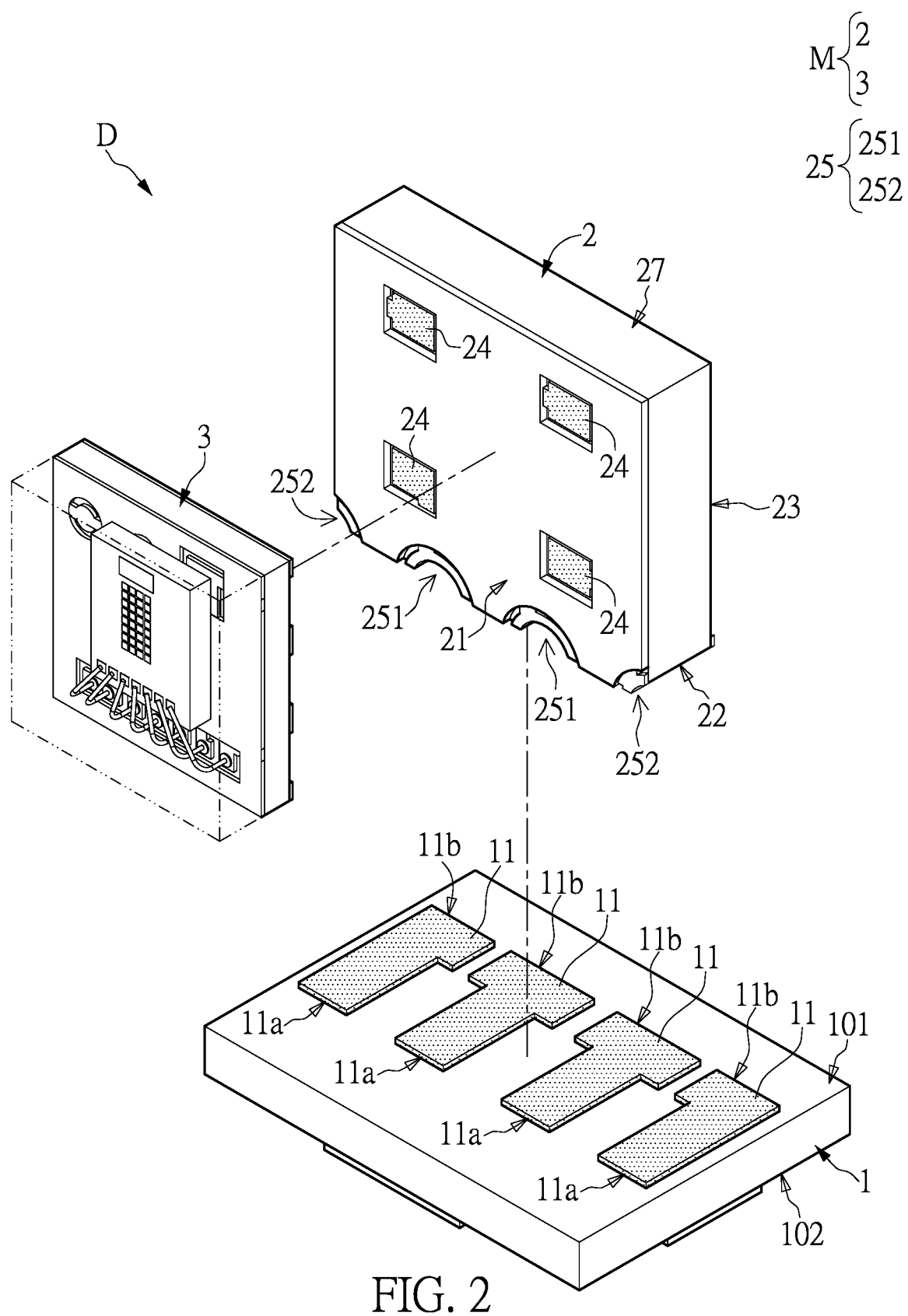
FIG. 2 is a schematic exploded view of the optical sensing module according to the present disclosure.
Figure 3:
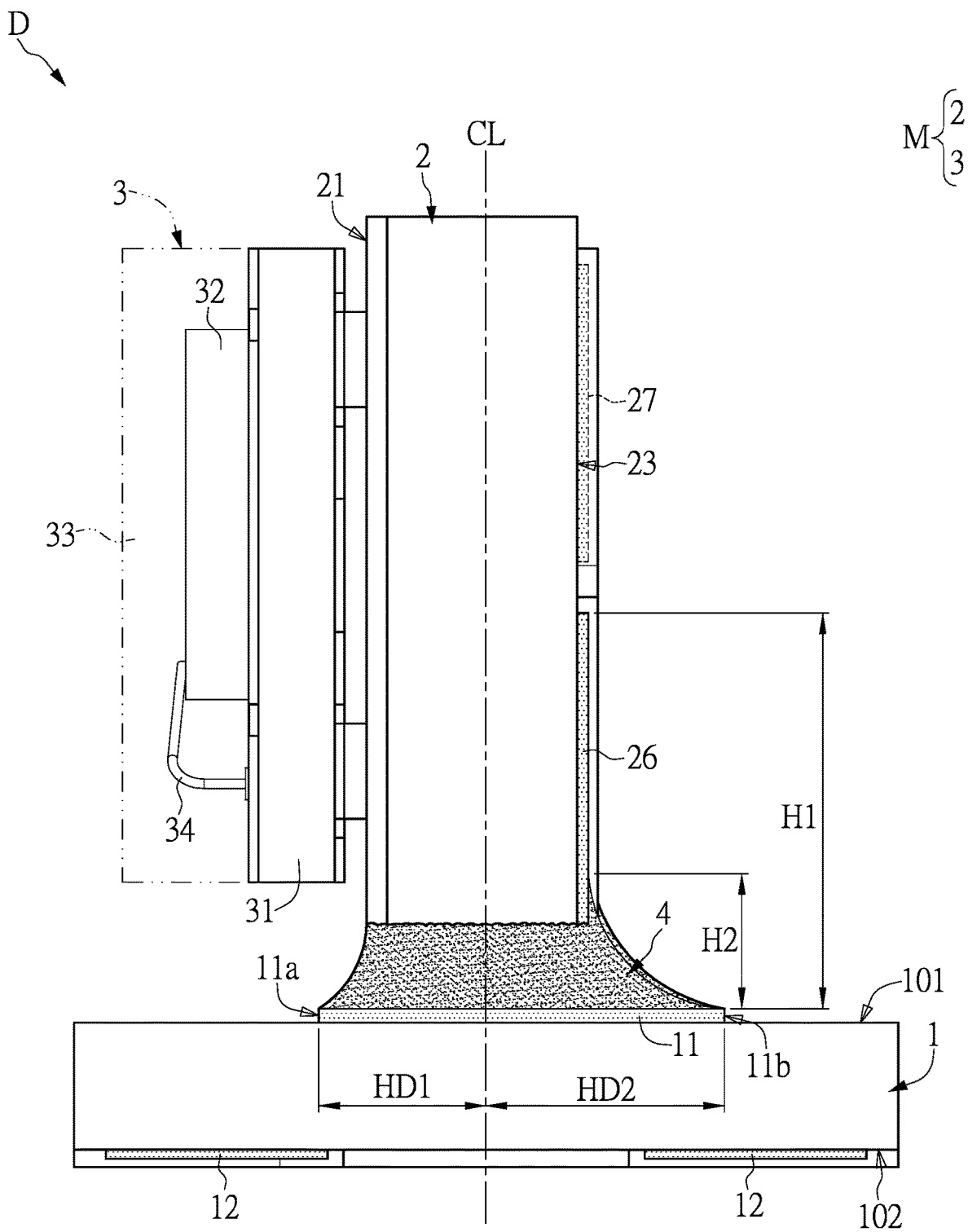
FIG. 3 is a schematic side view of the optical sensing module according to the present disclosure.

Referring to FIG. 1 to FIG. 3, FIG. 1 is a schematic view of an optical sensing module according to the present disclosure, FIG. 2 is a schematic exploded view of the optical sensing module according to the present disclosure, and FIG. 3 is a schematic side view of the optical sensing module according to the present disclosure. The present disclosure provides an optical sensing module D, which includes a substrate 1 and an optical sensing device M. The substrate 1 has an upper surface 101, and the upper surface 101 has a plurality of first soldering pads 11. The optical sensing device M is disposed upright on the substrate 1 to form a lateral packaging structure. For example, the optical sensing device M can be an ambient light sensor, but the present disclosure is not limited thereto.

The optical sensing device M includes a transposition plate 2 and an optical sensing package 3. The transposition plate 2 includes a first surface 21, a second surface 22, and a third surface 23. The first surface 21 and the third surface 23 are located on opposite sides of the transposition plate 2, and the second surface 22 is connected between the first surface 21 and the third surface 23. The first surface 21 has a plurality of second soldering pads 24. The second surface 22 has a plurality of conductive through holes 25. Each of the conductive through holes 25 passes through the first surface 21 and the third surface 23, and each of the conductive through holes 25 is plated with a metal layer such as copper. The third surface 23 has a plurality of metal ribs 26. Furthermore, the plurality of conductive through holes 25 are electrically connected to the plurality of second soldering pads 24 and the plurality of metal ribs 26.

The optical sensing package 3 is disposed on the first surface 21 of the transposition plate 2, and the transposition plate 2 is disposed on the upper surface 101 of the substrate 1. The light sensing package 3 is electrically connected to the plurality of second soldering pads 24 on the transposition plate 2 through lead portions (not shown in the figures) at a bottom of the light sensing package 3. The transposition plate 2 is electrically connected to the plurality of first soldering pads 11 of the substrate 1 through the conductive through holes 25 located on the second surface 12. Moreover, the optical sensing module D further includes a plurality of solders 4. The plurality of solders 4 are soldered to the plurality of conductive through holes 25 and the plurality of first soldering pads 11, such that the optical sensing device M is fixed on the substrate 1. In the present disclosure, the plurality of solders 4 are not only connected between the plurality of conductive through holes 25 of the transposition plate 2 and the plurality of first soldering pads 11 of the substrate 1, but also climb onto the plurality of metal ribs 26 on the third surface 23.

The solders 4 are implemented in the form of solder paste. The type of the solder paste is not limited on the present disclosure. For example, the material of the solders 4 can be solder paste with high temperature (e.g., a melting point of 286° C.) made of tin-antimony (Sn—Sb) alloy, or another solder paste with high temperature (e.g., a melting point of 240° C.) made of a tin-silver-copper (Sn—Ag—Cu) alloy, or solder paste with low temperature (e.g., a melting point of 175° C.) made of tin-bismuth (Sn—Bi) alloy.

Figure 5:
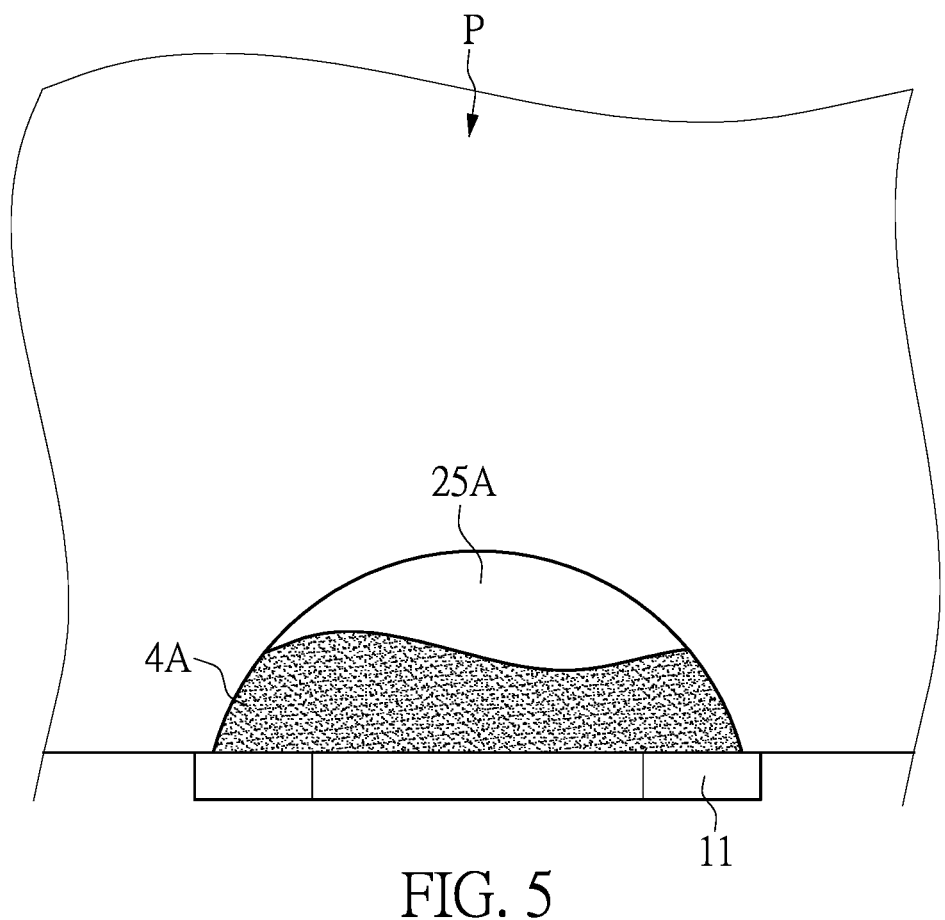
FIG. 5 is a schematic view of projections of a conductive through hole and a solder of the optical sensing module according to the present disclosure.

In addition, there is an accommodation space between each of the conductive through holes 25 and the corresponding first soldering pad 11, in which each of the solders 4 is filled and connected to the conductive through hole 25 and the first soldering pad 11. Referring to FIG. 2 and FIG. 5, FIG. 5 is a schematic view of projections of a conductive through hole and a solder of the optical sensing module according to the present disclosure. A view angle in FIG. 5 can be traced along a direction towards which the first surface 21 perpendicular to the transposition plate 2 in FIG. 2 extends. A plane P is defined according to the configuration of the transposition plate 2, and the plane P is parallel to the first surface 21. Each of the conductive through holes 25 has a first projection 25A (i.e., a semicircular area in FIG. 5) that is projected onto the plane P. Each of the solders 4 has a second projection 4A that is projected onto the plane P. A ratio of the second projection 4A to the first projection 25A is greater than 0.5, thereby preventing the empty soldering phenomenon.

Figure 6:
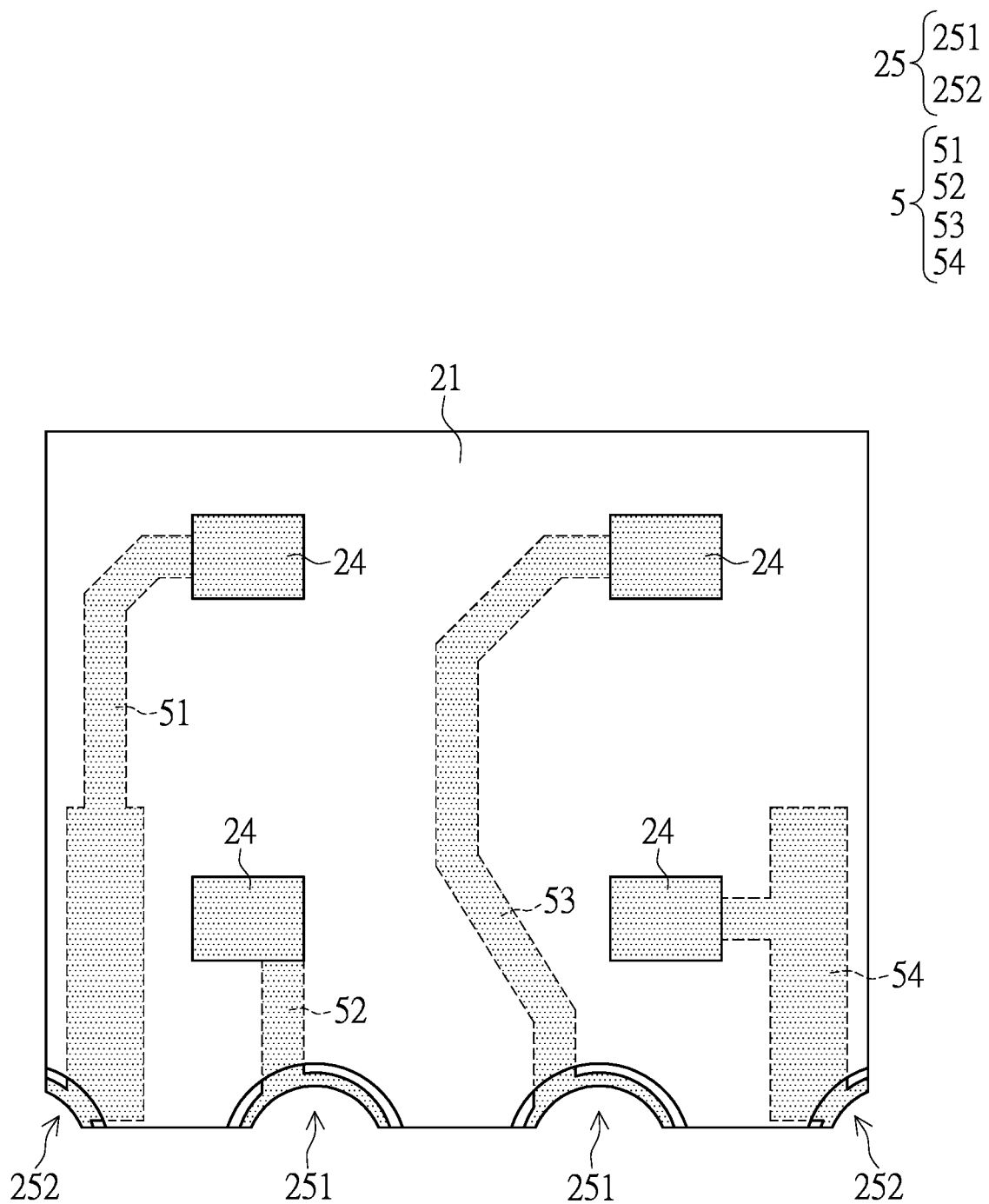
FIG. 6 is a schematic front view of a transposition plate of the optical sensing module according to the present disclosure.

Referring to FIG. 3 and FIG. 6, FIG. 6 is a schematic front view of a transposition plate of the optical sensing module according to the present disclosure. The plurality of conductive through holes 25 includes at least one first conductive through hole 251 and two second conductive through holes 252. The at least one first conductive through hole 251 is disposed between the two second conductive through holes 252. The two second conductive through holes 252 are respectively disposed at corners on both sides of a bottom of the first surface 21. A quantity of the first conductive through hole 251 is not limited in the present disclosure. In the present disclosure, the transposition plate 2 has two first conductive through holes 251 that are evenly distributed between the two second conductive through holes 252. In addition, a contour of the at least one first conductive through hole 251 forms a semi-cylindrical shape, and a contour of each of the two second conductive through holes 252 forms a ¼ cylindrical shape, but the present disclosure is not limited thereto.

Specifically, as shown in FIG. 6, the first surface 21 of the transposition plate 2 further includes a metal pattern layer 5. The metal pattern layer 5 includes four metal pattern structures 51, 52, 53, 54. The four metal pattern structures 51, 52, 53, 54 are covered by a solder mask layer and are not exposed. One end of each of the metal pattern structures is connected to the second soldering pad 24, and another end of each of the metal pattern structures extends to the conductive through holes 25 of the third surface 22.

Figure 7:
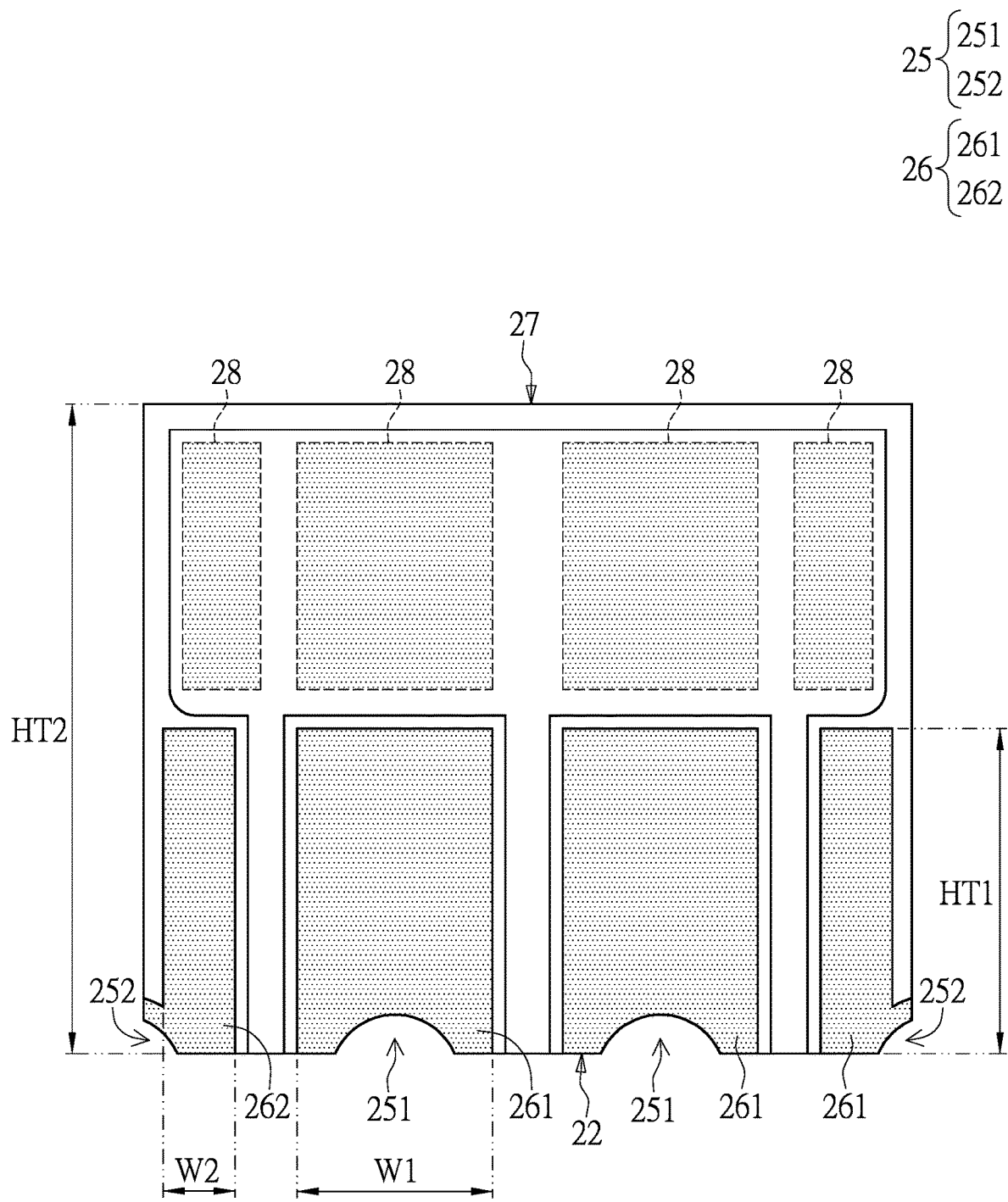
FIG. 7 is a schematic back view of a transposition plate of the optical sensing module according to the present disclosure.

Referring to FIG. 7, FIG. 7 is a schematic back view of a transposition plate of the optical sensing module according to the present disclosure. A height HT1 of each of the metal ribs 26 is at least greater than ½ of a height HT2 of the transposition plate 2. It should be noted that the transposition plate 2 also has a fourth surface 27. The height HT2 of the transposition plate 2 refers to a vertical distance between the top (i.e., the fourth surface 27) and the bottom (i.e., the second surface 22) of the transposition plate 2.

The plurality of metal ribs 26 includes at least one first metal rib 261 and two second metal ribs 262. The at least one first metal rib 261 is disposed between the two second metal ribs 262. The at least one first metal rib 261 is connected to the at least one first conductive through hole 251. The two second metal ribs 262 are respectively connected to the two second conductive through holes 252. A quantity of the first metal rib 261 is not limited in the present disclosure. In the present disclosure, the transposition plate 2 includes two first metal ribs 261 that are evenly distributed between the two second metal ribs 262, and the two first metal ribs 261 are respectively connected to the two first conductive through holes 251. Furthermore, the first metal rib 261 has a first width W1, the two second metal rib 262 has a second width W2, and the first width W1 is greater than the second width W2. Preferably, a width ratio of the first width W1 to the second width W2 is 2.8 to 1.

Through the design of the height HT1 of each metal ribs 26 being at least greater than ½ of the height HT2 of the transposition plate 2, and the width ratio of the first metal rib 261 and the second metal rib 262 being 2.8 to 1, the height to which the solders 4 climb to the metal ribs 26 can be increased. As shown in FIG. 3, a top of each of the metal ribs 26 and a surface of a corresponding one of the first soldering pads 11 define a first height H1 therebetween, a climbing height of each of the solders 4 on a corresponding one of the metal ribs 26 is a second height H2, and a ratio of the second height H2 to the first height H1 is greater than 0.25. Preferably, the ratio of the second height H2 to the first height H1 is greater than 0.5. Through the structural design of the metal ribs 26, the climbing height of the solders 4 can be increased, thereby improving the supporting force provided by the solders 4 on the third surface 23 of the transposition plate 2.

As shown in FIG. 7, the transposition plate 2 further includes at least one metal portion 28. The at least one metal portion 28 is disposed on the third surface 23 and is adjacent to the plurality of metal ribs 26. It should be noted that at least one metal portion 28 is covered by a solder mask layer on the third surface 23 and is not exposed. A quantity and size of the metal portion 28 is not limited in the present disclosure. In the present disclosure, the transposition plate 2 includes four metal portions 28 that are distributed above the plurality of metal ribs 26. However, it is worth mentioning that the metal portion 28 and the metal rib 26 are made of a same material. Moreover, configurations such as the number and size of the metal portion 28 are preferably designed corresponding to the metal rib 26, such that the metal portion 28 and the metal rib 26 can have consistent deformation during the thermal expansion. Therefore, through the arrangement of the metal portion 28, the weights on both sides (i.e., the first surface 21 and the third surface 23) of the transposition plate 2 are further adjusted, such that the gravity center of the optical sensing device M can be evenly distributed, thereby achieving the effect of stabilizing the overall structure.

Figure 8:
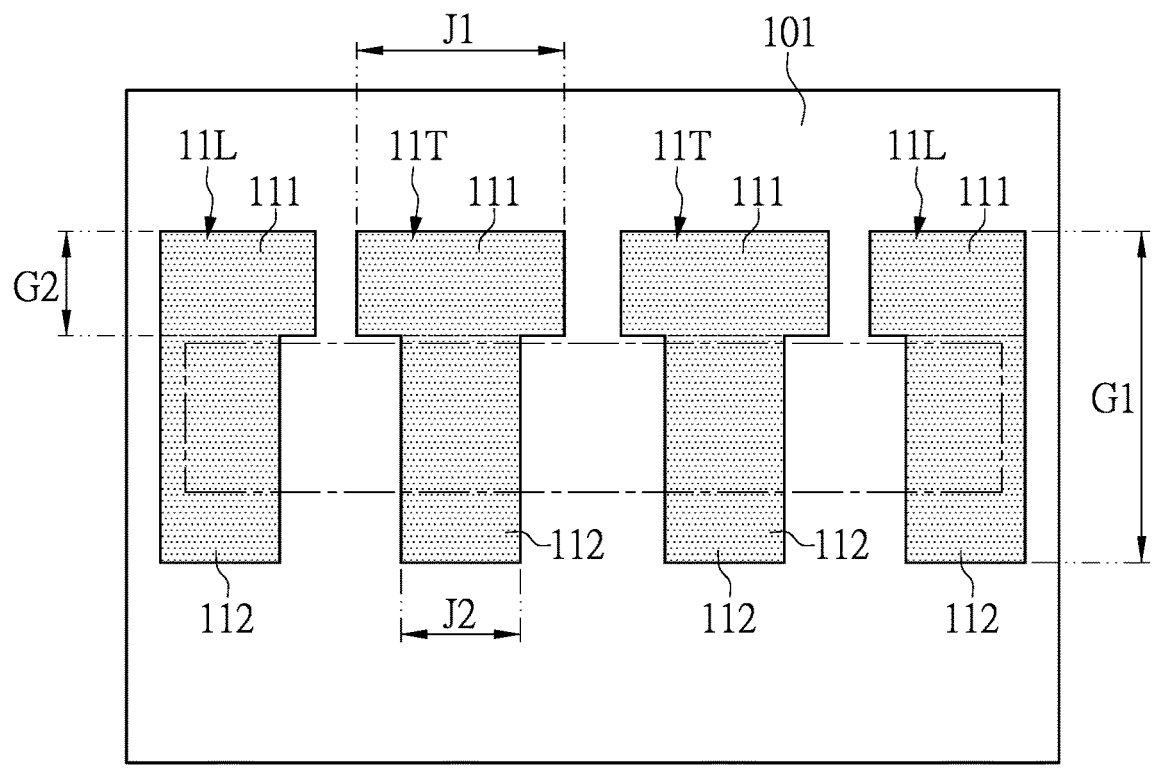
FIG. 8 is a schematic top view of a substrate of the optical sensing module according to the present disclosure.

Referring to FIG. 1, FIG. 2, and FIG. 8, FIG. 8 is a schematic top view of a substrate of the optical sensing module according to the present disclosure. Each of the first soldering pads 11 includes a transverse portion 111 and a longitudinal portion 112. The longitudinal portion 112 is vertically connected to a side of the transverse portion 111. Moreover, the plurality of first soldering pads 11 includes at least one T-shaped soldering pad 11T and two L-shaped soldering pads 11L. The at least one T-shaped soldering pad 11T is located between the two L-shaped soldering pads 11L. The at least one T-shaped soldering pad 11T is electrically connected to the at least one first conductive through hole 251 through the solder 4. The two L-shaped soldering pads 11L are electrically connected to the two second conductive through holes 252 through the solders 4.

As shown in FIGS. 2, 3, and 8, when the transposition plate 2 is disposed on the substrate 1, the transverse portion 111 is located on a same side as the third surface 23 of the transposition plate 2. A ratio of a transverse length J1 of the transverse portion 111 to a transverse length J2 of the longitudinal portion 112 is 1.8 to 1, and a ratio of a longitudinal length G1 of the first soldering pad 11 to a longitudinal length G2 of the transverse portion 111 is 1.4 to 1.

As shown in FIGS. 2 and 3, each of the first soldering pads 11 has a first side 11a and a second side 12a. When the transposition plate 2 is disposed on the substrate 1, the first side 11a is located on a same side as the first surface 21 of the transposition plate 2, and the second side 11b is located on a same side as the third surface 23 of the transposition plate 2. A central position of the second surface 22 of the transposition plate 2 is spaced apart from the first side 11a by a first horizontal distance HD1, and the central position of the second surface 22 of the transposition plate 2 is spaced apart from the second side 11b by a second horizontal distance HD2. The first horizontal distance HD1 is smaller than the second horizontal distance HD2. In other words, when the transposition plate 2 is disposed on the first soldering pads 11 of the substrate 1, the transposition plate 2 is closer to the first sides 11a of the first soldering pads 11 than the second sides 11b of the first soldering pads 11.

As shown in FIGS. 3 and 8, the position of the transposition plate 2 on the first soldering pads 11 is shown in a dotted line frame in FIG. 8. The transposition plate 2 is disposed on the longitudinal portions 112 of the first soldering pads 11, which leaves the transverse portions 111 free to carry more of the solders 4. Therefore, through the structural design of the transverse portions 111 of the first soldering pads 11 and the arrangement of the position of the transposition plate 2, the weight ratio of the solders 4 on one side of the third surface 23 of the transposition plate 2 is increased, thereby improving the supporting force of the solders 4 on this side.

Figure 4:
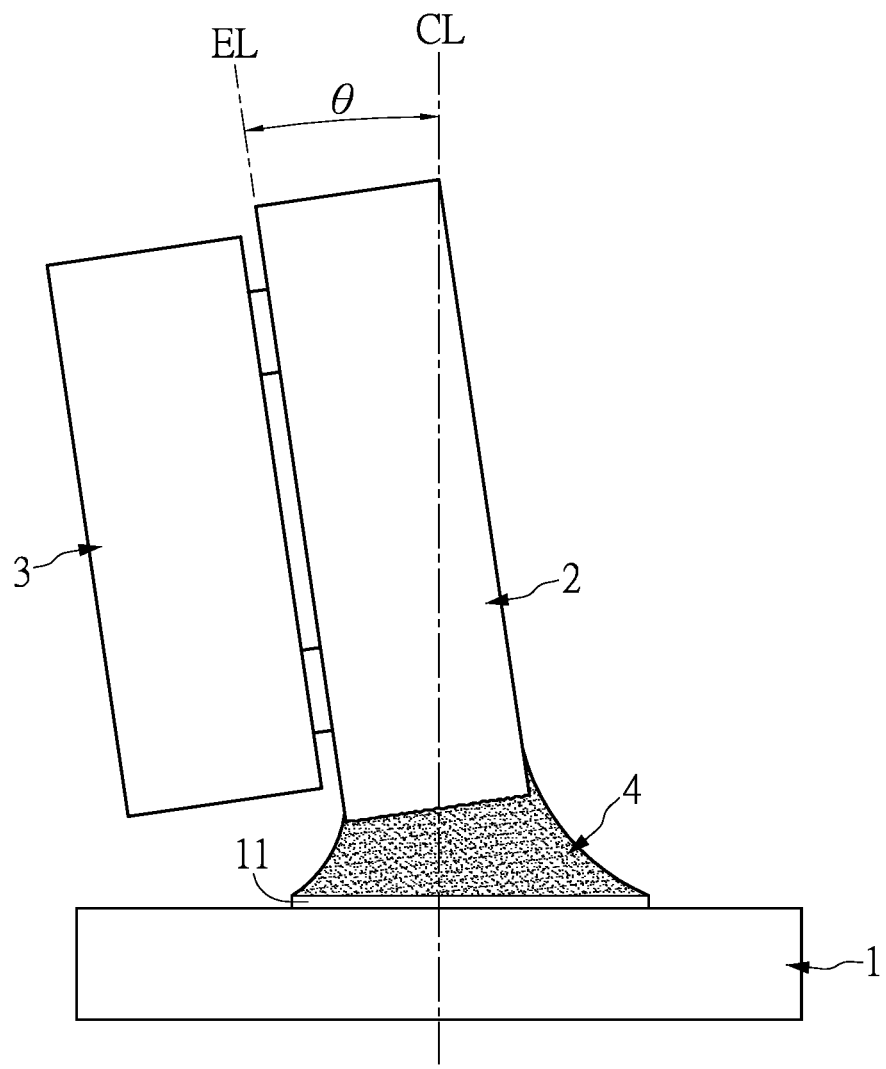
FIG. 4 is a schematic view of an optical sensing device of the optical sensing module being tilted according to the present disclosure.

As shown in FIG. 2 and FIG. 4, FIG. 4 is a schematic view of an optical sensing device of the optical sensing module being tilted according to the present disclosure. A central line CL is defined at the central position of the second surface 22 of the transposition plate 2. The transposition plate 2 has an inclination angle θ relative to the central line CL, and the inclination angle θ is less than 5 degrees. As shown in FIG. 4, an extension line EL extends along the first surface 21 of the transposition plate 2. An angle between the extension line EL and the central line CL is the inclination angle θ of the transposition plate 2 relative to the central line CL. Therefore, the climbing height of the solders 4 can be increased through the structural design of the metal ribs 26, and the weight ratio of the solders 4 on one side of the third surface 23 of the transposition plate 2 is increased through the structural design of the transverse portions 111 of the first soldering pads 11 and the arrangement of the position of the transposition plate 2, thereby improving the supporting force provided by the solders 4 on the third surface 23. For a lateral packaging structure, the optical sensing element is located on one side of the transposition plate, which can easily cause the gravity center to shift and the lateral packaging structure to be tilted. However, through the above-mentioned improved design, the lateral packaging structure of the present disclosure can reduce the level of tilt. Preferably, in the present disclosure, the inclination angle θ is less than 5 degrees.

Figure 9:
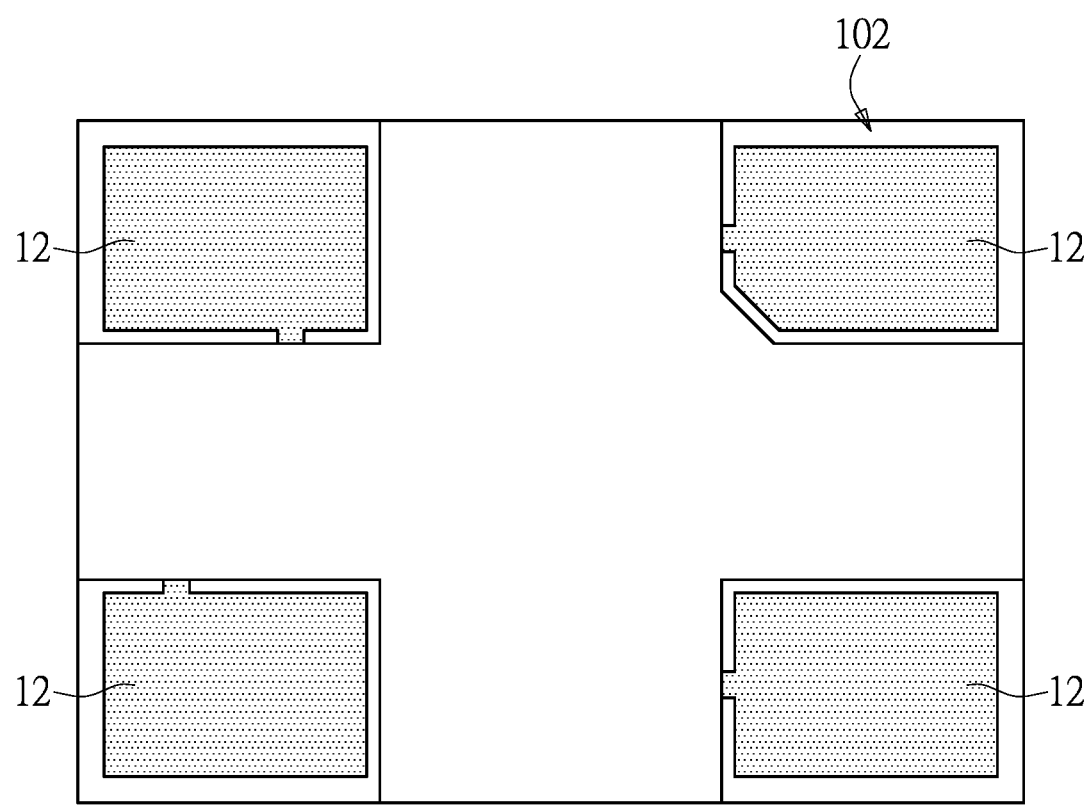
FIG. 9 is a schematic bottom view of the substrate of the optical sensing module according to the present disclosure.

Referring to FIG. 9, FIG. 9 is a schematic bottom view of the substrate of the optical sensing module according to the present disclosure. The substrate 1 further includes a plurality of third soldering pads 12, and the plurality of third soldering pads 12 are disposed on a lower surface 102 of the substrate 1 and respectively located at four corners of the lower surface 102. The plurality of third soldering pads 12 are respectively electrically connected to the plurality of first soldering pads 11, and the substrate 1 can be soldered to an external circuit board (not shown in the figures) through the plurality of third soldering pads 12. Therefore, when the optical sensing package 3 is disposed on the substrate 1 through the transposition plate 2, the optical sensing package 3 can be electrically connected to the external circuit board through the second soldering pads 24 and the conductive through holes 25 of the transposition plate 2, and the first soldering pads 11 and the third soldering pads 12 of the substrate 1.

Figure 10:
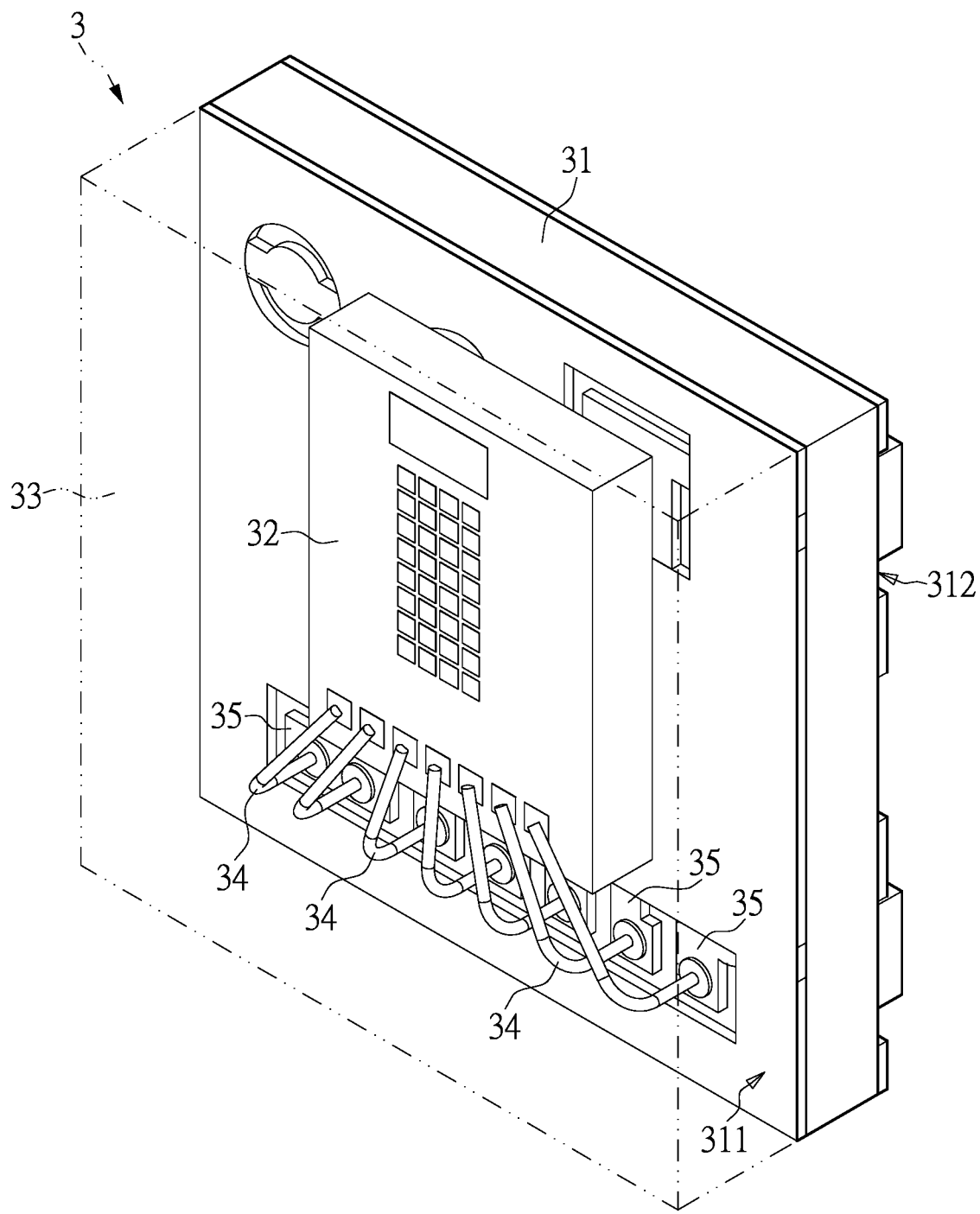
FIG. 10 is a schematic view of an optical sensing package of the optical sensing module according to the present disclosure.

Referring to FIG. 10, FIG. 10 is a schematic view of an optical sensing package of the optical sensing module according to the present disclosure. The optical sensing package 3 includes a carrier 31, a sensing element 32, and a package body 33. The carrier 31 has a first lateral surface 311 and a second lateral surface 312. The sensing element 32 is disposed on the first lateral surface 311, and is electrically connected to the carrier 31 through a plurality of metal conductive wires 34. The package body 33 is disposed on the first lateral surface 311 and completely covers the sensing element 32 and the plurality of metal conductive wires 34. The second lateral surface 312 has a plurality of electrically conductive portions 35, and the plurality of electrically conductive portions 35 are electrically connected to the sensing element 32 through the plurality of metal conductive wires 34. When the optical sensing package 3 is disposed on the first surface 21 of the transposition plate 2, the plurality of electrically conductive portions 35 are electrically connected to the plurality of second soldering pads 12, respectively.

Beneficial Effects of the Embodiment

In the optical sensing module provided by the present disclosure, by virtue of the metal ribs 26 being connected to the conductive through holes 25 that are disposed on the third surface 23 of the transposition plate 2 away from the optical sensing package 3, the solders 4 can further climb from the conductive through holes 25 to the metal ribs 26 to a certain height, so as to improve the adhesive force of the solders 4 bonding to the back side of the transposition plate 2 and the overall structural strength, and prevent the overall structure of the optical sensing device M from being tilted towards the side where the sensing element 3 is fixed on the transposition plate 2.

Moreover, the climbing height of the solders 4 can be increased through the structural design of the metal ribs 26, and the weight ratio of the solders 4 on one side of the third surface 23 of the transposition plate 2 is increased through the structural design of the transverse portions 111 of the first soldering pads 11 and the arrangement of the position of the transposition plate 2, thereby improving the supporting force provided by the solders 4 on the third surface 23. For the lateral packaging structure, the optical sensing element is located on one side of the transposition plate, which can easily cause the gravity center to shift and the lateral packaging structure to be tilted. However, through the above-mentioned improved design, the lateral packaging structure of the present disclosure can reduce the level of tilt. Preferably, in the present disclosure, the inclination angle θ of the transposition plate 2 is less than 5 degrees.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An optical sensing module, comprising:
   a substrate having an upper surface, wherein the upper surface has a plurality of first soldering pads;
   an optical sensing device disposed upright on the substrate and including:
      a transposition plate having a first surface, a second surface, and a third surface, the first surface and the third surface are located on opposite sides of the transposition plate, the second surface is connected between the first surface and the third surface, the first surface has a plurality of second soldering pads, the second surface has a plurality of conductive through holes, the third surface has a plurality of metal ribs, and the plurality of conductive through holes are electrically connected to the plurality of second soldering pads and the plurality of metal ribs; and an optical sensing package disposed on the first surface and electrically connected to the plurality of second soldering pads; and a plurality of solders connected to the plurality of conductive through holes and the plurality of metal ribs;

wherein a top of each of the metal ribs and a surface of a corresponding one of the first soldering pads define a first height therebetween, the plurality of solders respectively climb onto the plurality of metal ribs, a climbing height of each of the solders on a corresponding one of the metal ribs is a second height, and a ratio of the second height to the first height is greater than 0.25.

2. The optical sensing module according to claim 1, wherein the ratio of the second height to the first height is greater than 0.5.

3. The optical sensing module according to claim 1, wherein a height of each of the metal ribs is at least greater than ½ of a height of the transposition plate.

4. The optical sensing module according to claim 1, wherein a plane parallel to the first surface is defined according to a configuration of the transposition plate, each of the conductive through holes has a first projection that is projected onto the plane, each of the solders has a second projection that is projected onto the plane, and a ratio of the second projection to the first projection is greater than 0.5.

5. The optical sensing module according to claim 1, wherein the plurality of conductive through holes includes at least one first conductive through hole and two second conductive through holes, the at least one first conductive through hole is disposed between the two second conductive through holes, a contour of the at least one first conductive through hole forms a semi-cylindrical shape, and a contour of each of the two second conductive through holes forms a ¼ cylindrical shape.

6. The optical sensing module according to claim 5, wherein the plurality of metal ribs includes at least one first metal rib and two second metal ribs, the at least one first metal rib is disposed between the two second metal ribs, the at least one first metal rib is connected to the at least one first conductive through hole, and the two second metal ribs are respectively connected to the two second conductive through holes.

7. The optical sensing module according to claim 6, wherein the at least one first metal rib has a first width, each of the two second metal ribs has a second width, and the first width is greater than the second width.

8. The optical sensing module according to claim 6, wherein the plurality of first soldering pads includes at least one T-shaped soldering pad and two L-shaped soldering pads, the at least one T-shaped soldering pad is located between the two L-shaped soldering pads, the at least one T-shaped soldering pad is electrically connected to the at least one first conductive through hole through a corresponding one of the solders, and the two L-shaped soldering pads are electrically connected to the two second conductive through holes through corresponding ones of the solders.

9. The optical sensing module according to claim 6, wherein each of the first soldering pads includes a transverse portion and a longitudinal portion that is vertically connected to a side of the transverse portion, the transverse portion is located on a same side as the third surface of the transposition plate, and the transposition plate is disposed on the longitudinal portion.

10. The optical sensing module according to claim 6, wherein a transverse length ratio of the transverse portion to the longitudinal portion is 1.8 to 1, and a longitudinal length ratio of the first soldering pad to the transverse portion is 1.4 to 1.

11. The optical sensing module according to claim 1, wherein the transposition plate further includes at least one metal portion, and the at least one metal portion is disposed on the third surface and adjacent to the plurality of metal ribs.

12. The optical sensing module according to claim 1, wherein each of the first soldering pads has a first side and a second side, the first side is located on a same side as the first surface of the transposition plate, the second side is located on a same side as the third surface of the transposition plate, a central position of the second surface of the transposition plate is spaced apart from the first side and the second side respectively by a first horizontal distance and a second horizontal distance, and the first horizontal distance is smaller than the second horizontal distance.

13. The optical sensing module according to claim 1, wherein a central line is defined at a central position of the second surface of the transposition plate, the transposition plate has an inclination angle relative to the central line, and the inclination angle is less than 5 degrees.

14. The optical sensing module according to claim 1, wherein the substrate further includes a plurality of third soldering pads, the plurality of third soldering pads are disposed on a lower surface of the substrate and respectively located at four corners of the lower surface, and the plurality of third soldering pads are electrically connected to the plurality of first soldering pads, respectively.

15. The optical sensing module according to claim 1, wherein the optical sensing package includes a carrier, a sensing element, and a package body, the carrier has a first lateral surface and a second lateral surface, the sensing element is disposed on the first lateral surface, the sensing element is electrically connected to the carrier through a plurality of metal conductive wires, the package body is disposed on the first lateral surface and completely covers the sensing element and the plurality of metal conductive wires, the second lateral surface has a plurality of electrically conductive portions, and the plurality of electrically conductive portions are electrically connected to the sensing element through the plurality of metal conductive wires; wherein, when the optical sensing package is disposed on the first surface of the transposition plate, the plurality of electrically conductive portions are electrically connected to the plurality of second soldering pads, respectively.

16. The optical sensing module according to claim 1, wherein the material of the solders includes tin-antimony alloy, tin-silver-copper alloy or tin-bismuth alloy.

* * * * *